US008092732B2

(12) United States Patent
Chou et al.

(10) Patent No.: US 8,092,732 B2
(45) Date of Patent: Jan. 10, 2012

(54) PROCESSING METHOD OF THE NATURAL CELLULOSE FIBER WITH FEATURE FOR ENHANCING THE CAPABILITY OF ANTIFUNGI, ANTIBACTERIA AND DEODORIZATION (75) Inventors: Wen-Tung Chou, Changhua County (TW); Ming-Yi Lai, Changhua County (TW); Kun-Shan Huang, Tainan (TW)

(73) Assignee: Acelon Chemical and Fiber Corporation, Puyan Township (TW)

( * ) Notice: Subject to any disclaimer, the term of this patent is extended or adjusted under 35 U.S.C. 154(b) by 469 days.

(21) Appl. No.: 12/318,549

(22) Filed: Dec. 31, 2008

(65) Prior Publication Data
US 2009/0166916 A1 Jul. 2, 2009

(30) Foreign Application Priority Data
Dec. 31, 2007 (TW) ................................ 96151349 A (51) Int. Cl.
B29C 47/00 (2006.01)
C08B 37/08 (2006.01)
D01D 5/12 (2006.01)
C07H 1/00 (2006.01)

(52) U.S. Cl. ...................... 264/207; 264/176.1; 264/204; 264/205; 264/210.1; 264/210.2; 264/210.3; 264/211.12; 264/211.13; 264/211.15; 264/211.16; 264/211.18; 264/211.19; 264/211.2; 536/20; 536/55.1; 536/126

(58) Field of Classification Search ............... 264/176.1, 264/204, 205, 207, 210.1, 210.2, 210.3, 211.12, 264/211.13, 211.15, 211.16, 211.18, 211.19, 264/211.2
See application file for complete search history.

(56) References Cited

U.S. PATENT DOCUMENTS

| 4,861,659 | A | * | 8/1989 | Takada et al. ................ 428/364 |
| 5,320,903 | A | * | 6/1994 | Hirukawa et al. ............. 428/364 |
| 6,130,321 | A | | 10/2000 | Johnson et al. |

(Continued)

FOREIGN PATENT DOCUMENTS
TW 464700 11/2001

OTHER PUBLICATIONS
U.S. Appl. No. 12/318,550, filed Dec. 31, 2008.

Primary Examiner — Christina Johnson
Assistant Examiner — Atul P Khare
(74) Attorney, Agent, or Firm — Bacon & Thomas, PLLC (57) ABSTRACT

The present invention provides a processing method of the natural cellulose fiber with feature for enhancing the capability of antifungi, antibacteria and deodorization. The procedure is that firstly modify and reduce the properties of the natural chitosan of high polymer material to nanometer scale; secondly dunk the chitosan into the syrup-like mixture of wood pulp and NMMO solvent to yield quasi-dope; thirdly dehydrate the quasi-dope of paste mixture to form the mud-like dope; fourthly spin the dope by dryjet wet spinning method; fifthly regenerate the filament in coagulation bath, water rinse and dry; finally water rinse, dry, apply the lubricant to finish. The water soluble chitosan, which has been treated by property modification and reduced to nanometer scale, can effectively and completely solve in the cellulose of low DP to offer wider extent of selection in the DP and better flexibility of adding percentage in content of modified chitosan.

13 Claims, 3 Drawing Sheets

U.S. PATENT DOCUMENTS

| | | | | |
|---|---|---|---|---|
| 6,143,835 A | * | 11/2000 | Capone et al. | 525/329.1 |
| 6,524,508 B1 | | 2/2003 | Ohnishi et al. | 264/182 |
| 6,551,705 B1 | | 4/2003 | Ohnishi et al. | 428/372 |
| 6,638,918 B2 | | 10/2003 | Davison et al. | |
| 6,916,465 B2 | | 7/2005 | Panzer et al. | |
| 7,081,139 B2 | * | 7/2006 | Joerger et al. | 8/115.54 |
| 7,094,372 B1 | | 8/2006 | Wang et al. | |
| 7,153,525 B1 | | 12/2006 | Mumper et al. | 424/489 |
| 7,235,295 B2 | | 6/2007 | Laurencin et al. | 428/364 |
| 2009/0166916 A1 | | 7/2009 | Chou et al. | |
| 2009/0227784 A1 | * | 9/2009 | Chou et al. | 536/126 |

* cited by examiner

PROCESSING METHOD OF THE NATURAL CELLULOSE FIBER WITH FEATURE FOR ENHANCING THE CAPABILITY OF ANTIFUNGI, ANTIBACTERIA AND DEODORIZATION

FIELD OF THE PRESENT INVENTION

The present invention relates to a processing method of the natural cellulose fiber with feature of enhanced antifungal, antibacteria and deodorant capability, which belongs to the fiber processing technical field of the green environmental protection. The main procedure is that firstly modify and reduce the properties of the natural chitosan of high polymer to nanometer scale; then mix it with wood pulp and non-toxic NMMO solvent to yield dope; finally coordinate the improved Lyocell fiber process to produce natural cellulose fiber with feature of enhanced antifungal, antibacteria and deodorant capability.

BACKGROUND OF THE INVENTION

The Lyocell fiber (also named as solubility fiber), is a cellulose fabric that is obtained from wood pulp cellulose by an organic solvent spinning process, particularly is a regenerated fiber from solution of NMMO solvent with wood pulp cellulose by wet spinning method. In its process, the energy consumption is very low, the recovery rate of the NMMO solvent is over 99.5% for reuse, low toxicity without environmental pollution, the wastes are biodegradable in harmless and so like of advantages over the conventional colloid fiber so that it is called green fiber of the 21 century. Primitively, the process patent and product patent of the Lyocell fiber were granted to the German Akzo Nobel Company in 1978 and 1980 respectively. In 1989, the generic name "Lyocell fiber" was given by the international committee of artificial and synthetic fiber. Later on, it was successfully commercialized and marketed globally by the Courtaulds PLC of the United Kingdom (now known as Accordis Fibers) and the Austrian company Lenzing AG. Form the annual yield of 20 kilo-tons less up to over 200 kilo-tons nowadays with estimated expectation of 450 kilo-tons in 2010. Accordingly, the constant increment of the market share and influence of Lyocell fiber in the category of regenerated cellulose fiber is expectable in the future.

Moreover, due to excellent compatibility, the Lyocell fiber is easily blendless spun or blended with cotton, linen, silk, wool and synthetic fiber as well as colloid fiber to improve the fiber properties so that the fabrics from its yam has nice brilliance, softness, sleek, touch feeling and excellent suspension, air-permeability and wearing snugness. For pure Lyocell fabrics, owing to the pearl-like sheen, intrinsic fluid smoothness, aerial gauze-look and good suspension, various pure or blended dresses of different style are produced via diverse weaving and knitting technology such as high class jeans, women underwear and foundation garment, fashionable dress as well as men's high class shirt, recreational dress, casual dress and the like. For industrial application of the Lyocell fiber, its strength and dry tenacity is better than that of cotton and near to that of polyester, its moisture retention ability is approaching 90% dry tenacity, which is incomparable by other cellulose fibers. Therefore, the Lyocell fiber is widely applied in the non-woven, industrial filtering cloth, industrial filament and special paper. For instance, the Lyocell fiber can be fabricated via numerous technologies such as needle-punched method, hydro-entangled method, wet-laying method, dry-laying method and thermo-bonding method into various nonwovens with different feature, all of which are superior to the colloid fiber products. Besides, some European companies are researching on the application for the Lyocell fiber in the fields of sewing suture, fatigue clothes, protective clothes, diapers and medical clothes. Some Japanese paper manufacturers are researching on the special papers for specific usage.

Owing to the upsurge in the concept of environmental protection, the quality requirement in the clothes is accordingly promoted, the feature of antifungal, antibacteria and deodorant capability is most cared by the consumers especially. Examining the conventional process of the antibacteria fiber, most popular processes are "adding antibacteria agent method" and "fiber surface coating method", both of which have common drawback of the weak persistence in the antibacteria effect resulting in derivatives of harmful substance.

Accordingly, biological improving methods are created such as Taiwan Invention Patent in number of 147162 with title of "processing method of fiber with feature of antifungal, antibacteria and deodorant capability", which takes Lyocell fiber process in coordination with water soluble chitosan to produce fiber with feature of antifungal, antibacteria and deodorant capability. However, It is well known that chitin or chitosan is a linear poly-saccharide composed of randomly distributed $\beta$-(1-4)-linked D-glucosamine (deacetylated unit) and N-acetyl-D-glucosamine (acetylated unit). The chitin substance is widely distributed in the nature, such as shells of shrimp and crab (refer to theses of scholars Lai/1979, Austin et al.,/1981 and Knorr/1984). For waste re-usage in food processing point, chitin and chitosan are worthy to develop and research.

Besides, the output quantity and value in the processing of shrimp and crab is the primary project of Taiwan aquatic products for a long time because valuable protein, astaxanthin and chitin abound in wastes of shrimp and crab, which becomes harmful burden to the ecological environment if being left alone and conversely becomes high value-added material if well processed for resulting in solving waste issue to produce economical benefit. Thus, multiple benefits can be obtained by innovative process (refer to the theses of scholars Chen and Zin/1995, Chen/1997). Moreover, 20%~30% of chitin can be extracted from the shells of shrimp and crab by suitably purification process (refer to thesis of scholar Bough/1975). Various chitins of different degrees of deacetylation can be accomplished by thermal alkali treatment (refer to theses of scholars Knorr/1984, Grant et al.,/1988 and Lin/1992). The application field of the chitin/chitosan is widespread (refer to theses of scholars Muzzarelli/1977/1985, Knor/1984, Grant et al.,/1988, Sandford/1989, Lin/1992, Simpson et al.,/1994, Chen and Zin/1995, Chen/1997). Both of chitin and chitosan are environment-friendly with biodegradable and biocompatible features.

By perusal on the specifications and claims of Taiwan Invention Patent in number of 147162 with title of "processing method of fiber with feature of antifungal, antibacteria and deodorant capability", we realize that the process procedure is in steps of adopting existing 20%~30% chitin or chitosan extracted from shells of shrimp, crab and crustaceans in degree of deacetylation of 75%~99% to mix with solution of NMMO and wood pulp in coordination with conventional Lyocell fiber process for forming dope via thermal stirring and blending, then to yield cellulose fiber with feature of antifungal, antibacteria and deodorant capability by conventional wet-sinning method. By further studying the experimental embodiments of foregoing patent, the degree of deacetylation for the selected chitosan must between 85%~92%, the weight content percentage for the selected chitosan must be over 0.5% and the degree of polymerization for selected cellulose must be over 900 to yield cellulose fiber with feature of antifungal, antibacteria and deodorant capability. Therefore, if the degree of polymerization for selected cellulose is below 900, the cellulose will be unable to react with chitosan in complete solvation so that the expected feature of antifungal, antibacteria and deodorant capability is not achieved. Thus, for fiber of manufacturer in mass production, neither the selectable range in the degree of polymerization is acceptable nor the total processing cost is reasonable. By the same token, if the degree of deacetylation for the selected chitosan is beyond 85%~92% or the weight content percentage is less than 0.5%, the expected feature of antifungal, antibacteria and deodorant capability is not achieved even the degree of polymerization for selected cellulose is over 900.

Regarding the recycling method of solvent recovery in the process, no concrete technical disclosure is expressed but casually mentions it by an ambiguous phrase of "general decompressed condensing method", which is incomprehensible and doubtful to the people skilled in this field. Because the stain created by the thermal dissolution in the Lyocell fiber process will be dissolved in the water rinsing liquid, the processed solvent must be bleached before recovering procedure. Currently, hydrogen peroxide bleaching, active carbon bed absorption bleaching and sulfite bleaching are the three popular bleaching methods to be applied in different production scales. However, regardless either bleaching method being adopted, the cost for treating a great quantity water rinsing liquid used in the Lyocell fiber process will be innumerable. Thus, anyone of the foregoing three bleaching methods is practically inadequate from the economical viewpoint.

Besides, some filtration must be performed as some residues of active carbon and other impurities are contained in the water rinsing liquid after bleaching treatment aforesaid. Currently, frame-type filtrating machine, drum-type filtrating machine and bed-type filtrating machine are the three popular filtrating equipments to be adopted for treating these residues. For comprehensively considering all related factors such as equipment expense, filtrating speed and recovering quantity and the like, anyone of the foregoing three filtrating machines can not meet the requirement of the economical mass production. Moreover, as tiny quantity of NMMO is still remained in the water rinsing liquid after bleaching and filtrating treatments aforesaid, further refinement must be undertaken so that not only the consuming quantity of the solvent is decreased to minimum extent but also the quality of the recovered solvent is resumed to the original NMMO quality. All the conditions and issues mentioned above will happen in the process of mass production in association with the Taiwan Invention Patent in number of 147162 aforesaid, how can skip it over in perfunctory manner by only an ambiguous phrase of "general decompressed condensing method"?

SUMMARY OF THE INVENTION

The primary object of the present invention is to provide a processing method of the natural cellulose fiber with feature for enhancing the capability of antifungi, antibacteria and deodorization, which firstly modify and reduce the properties of the natural chitosan of high polymer material to nanometer scale; secondly dunk the chitosan into the syrup-like mixture of wood pulp and NMMO solvent to yield quasi-dope; thirdly dehydrate the quasi-dope of paste mixture to form the mud-like dope; fourthly spin the dope by dry-jet wet spinning method; fifthly regenerate the filament in coagulation bath, water rinse and dry; finally water rinse, dry, apply the lubricant to finish; Wherein, the chitosan can effectively solve in the cellulose of low DP to offer wider extent of selection in the DP and better flexibility of adding percentage in content of modified chitosan so that not only the application range is increased but also the total processing cost in mass production is reduced without sacrificing the effect in antifungal, antibacteria and deodorant capability.

The another object of the present invention is to provide a processing method of the natural cellulose fiber with feature for enhancing the capability of antifungi, antibacteria and deodorization so that the degree of de-acetylation for said chitosan, which has been treated by property modification and reduced to nanometer scale, can be decreased down to 50%, which not only the application range is increased but also the total processing cost in mass production is reduced without sacrificing the effect in antifungal, antibacteria and deodorant capability.

The further object of the present invention is to provide a processing method of the natural cellulose fiber with feature for enhancing the capability of antifungi, antibacteria and deodorization so that in the cellulose fiber, the weight percentage content of said chitosan, which has been treated by property modification and reduced to nanometer scale, can be decreased down to 0.1%, which not only the application range is increased but also the total processing cost in mass production is reduced without sacrificing the effect in antifungal, antibacteria and deodorant capability.

The furthermore object of the present invention is to provide a processing method of the natural cellulose fiber with feature for enhancing the capability of antifungi, antibacteria and deodorization, which has dopant of (1,3-phenylene-bis 2-oxazoline, BOX) stabilizer mixed in the solution of chitosan, wood cellulose and the NMMO to effectively reduce color stain and decrease decay of degree of the polymerization for the wood cellulose so that not only the physical properties of the fiber product can be promoted but also the processing cost can be decreased.

The other object of the present invention is to provide a processing method of the natural cellulose fiber with feature for enhancing the capability of antifungi, antibacteria and deodorization, whose recycling method for processed solvent recovery is achieved by effectively simplified equipments in coordination with four main procedures of bleach, filtration, condensation and refinement so as to have rather similar quality of recovered solvent as fresh NMMO solvent so that the consumption rate is below 0.5% and the total recovery rate is over 99.5%. Thereby, it not only deletes the possibility in polluting the environment but also effectively decreases the cost in solvent recovery. Thus, it results in clean process and economical effect in reusing the recycled resources.

DETAILED DESCRIPTION OF THE PREFERRED EMBODIMENTS

For further describing the processing procedure and efficacy of the present invention, the detailed description of experimental embodiments with associated drawings are disclosed as below.

Figure 1:
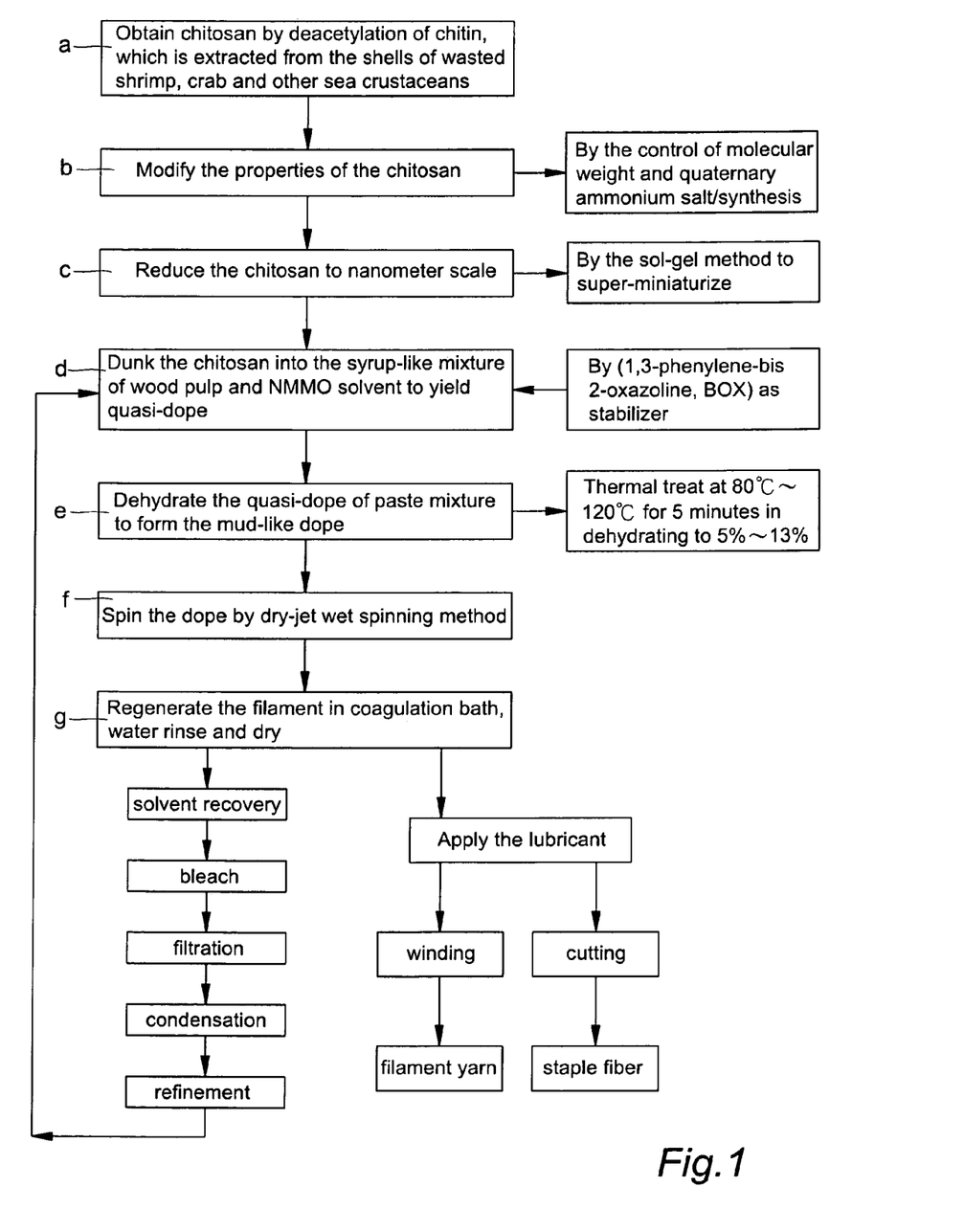
FIG. 1 is the flow chart of the processing procedure for the present invention.
Figure 2:
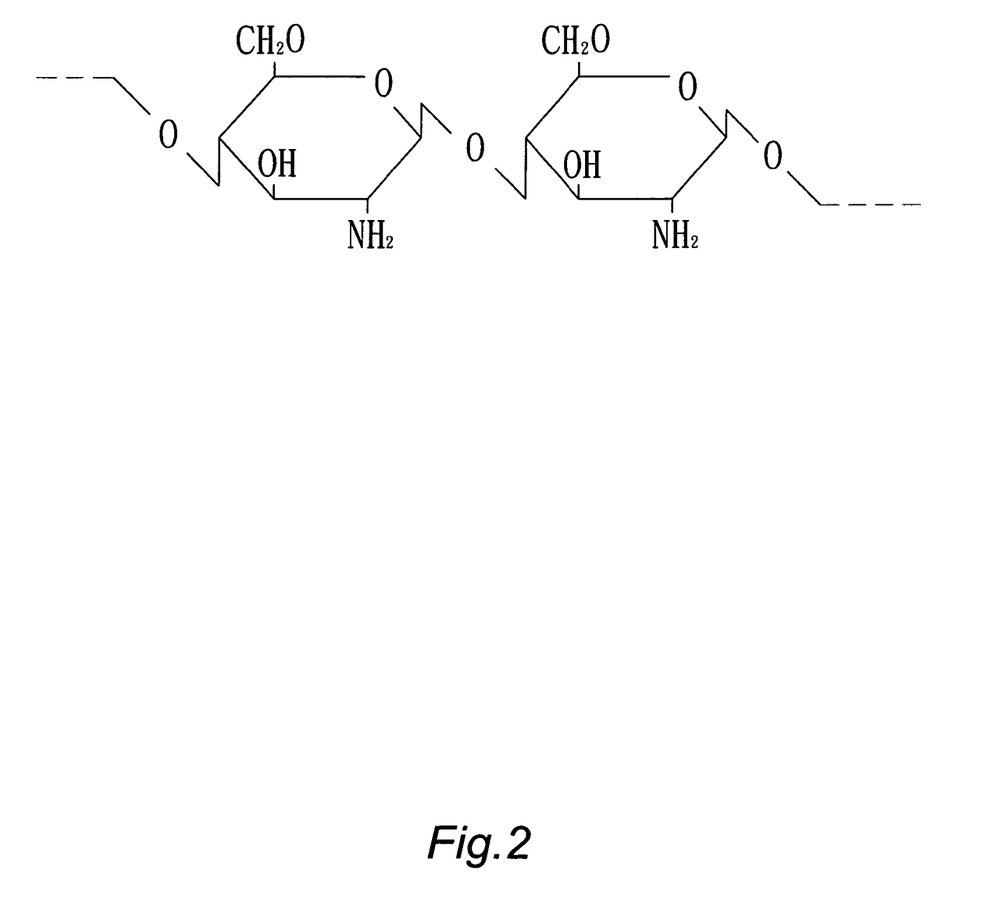
FIG. 2 is the chemical structure of the NMMO (N-methylmorpholine N-oxide) used in the present invention.
Figure 3:
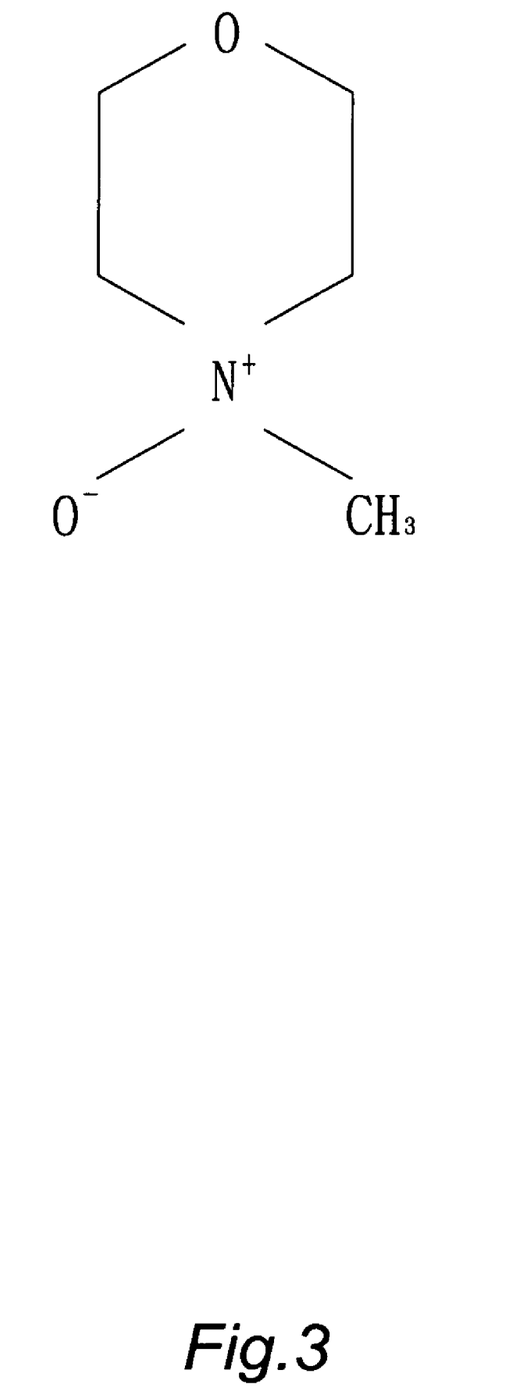
FIG. 3 is the chemical structure of the chitosan used in the present invention.

Please refer to the FIGS. 1 through 3. The processing procedure of the processing method of the natural cellulose fiber with feature for enhancing the capability of antifungi, antibacteria and deodorization includes steps as followings:

(a) Select wasted shells of shrimp, crab and other sea crustaceans as raw material, which is separated to refine and extract the chitin and becomes chitosan after removal of the internal N-acetyl group. Then, the chitosan is deacetylated by the control of NaOH concentration, heating temperature and treating time to have degree of the deacetylation between 50%~99%. Thus, the chemical structure of the chitosan is as shown in the FIG. 2.

(b) Modify the properties of the chitosan by following three ways: First method, control of the molecular weight: dissolve the chitosan in the diluted acid solution under specific temperature with different reacting time to degrade the chitosan for obtaining the interim chitosan of middle and low molecular weight; Second method, quaternary ammonium salt/synthesis: further modify the interim chitosan of middle and low molecular weight in the first method aforesaid by quaternary ammonium salt/synthesis to finish the property modification. Third method, directly modify the chitosan of high molecular weight by iodomethane ($CH_3I$) via quaternary ammonium salt/synthesis to finish the property modification.

(c) Reduce the chitosan to nanometer scale for the three modified chitosans mentioned in the preceding step (b) by sol-gel method respectively:

The Sol-Gel Method Corresponding to the First Method in the Preceding Step (b):

Dissolve the interim chitosan of middle and low molecular weight through treatment in the control of the molecular weight in the diluted acid solution together with proper quantity of alkali so that the resulting colloidal gel structural chitosan of nanometer scale is produced via hydrolysis, condensation and polymerization with average particle diameter of 82 nm;

The Sol-Gel Method Corresponding to the Second Method in the Preceding Step (b):

Dissolve the interim chitosan of middle and low molecular weight through treatments in the control of the molecular weight and the quaternary ammonium salt/synthesis in the aqueous solution of de-ionized water together with proper quantity of alkali so that the resulting colloidal gel structural chitosan of nanometer scale is produced via hydrolysis, condensation and polymerization with average particle diameter of 65.5 nm;

The Sol-Gel Method Corresponding to the Third Method in the Preceding Step (b):

Dissolve the interim chitosan of high molecular weight through treatment in the quaternary ammonium salt/synthesis in the aqueous solution of de-ionized water together with proper quantity of alkali so that the resulting colloidal gel structural chitosan of nanometer scale is produced via hydrolysis, condensation and polymerization with average particle diameter of 75.5 nm;

All the previous three chitosans, which have been reduced to nanometer scale, will possess enhanced antifungal, antibacteria and deodorant capability.

(d) Imerse the chitosans, which have been property modified and reduced to nanometer scale, into the syrup-like mixture of wood pulp and (N-methylmorpholine N-oxide, called NMMO for short) solvent with dopant of (1,3-phenylene-bis 2-oxazoline, BOX) stabilizer; Then, put foregoing chitosan, wood pulp cellulose, NMMO solvent and (1,3-phenylene-bis 2-oxazoline, BOX) stabilizer all together into the horizontal blending machine for mixing and mashing under low temperature of 60° C.~80° C. to yield quasi-dope; Wherein, the selected wood pulp cellulose is either filament fiber or staple fiber with content of α-cellulose over 85% and the (degree of polymerization, called DP for short) between 500~1200, the chemical structure of the used NMMO herein is as shown in the FIG. 3.

(e) Dehydrate the foregoing quasi-dope of syrup-like mixture by vacuum film evaporator and thermal treatment at 80° C.~120° C. for 5 minutes in dehydrating to 5%~13% so that the cellulose is dissolved into mud-like dope.

(f) Spin the dope by dry-jet wet spinning method: Force the dope to spinning machine by quantitative pump for extruding the dope from the spinneret into the coagulation bath via an air gap for coagulating and regenerating into filament, where in the action of air gap, that high performance of multiple spin draw ratio is given to the filament so that the filament is sufficient to bear the fluid resistance from the liquid of the coagulation bath for sinning out better fiber of high tensile strength, homogeneity and regularity.

(g) Rinse, dry and apply lubricant on the regenerated filament from the coagulation bath to produce the natural cellulose fiber with feature of enhanced antifungal, antibacteria and deodorant capability, wherein, either via drawing and winding process or via drawing, crimping/setting and cutting process, the resultant product can be either wound into continuous filament yam or cut into staple fiber in accordance with the specified length.

Wherein, for modifying the properties of the chitosan by control of the molecular weight in step (b), the actual processing example is depicted as below: dissolve the chitosan in the diluted hydrochloric acid solution under 70° C. reacting temperature with different reacting times such as 0.5 hour, 1 hour, 2 hour and 4 hour to degrade the chitosan for obtaining the interim chitosans of different molecular weights as shown in the Table (A) as below;

TABLE (A)

|  | hour | | | |
| --- | --- | --- | --- | --- |
|  | 0.5 | 1 | 2 | 4 |
| Molecular Weight (Mw) | 173300 | 63600 | 40900 | 20300 |

Moreover, for modifying the properties of the chitosan of high molecular weight by iodomethane ($CH_3I$) via quaternary ammonium salt/synthesis in step (b), the actual processing procedure is depicted as that firstly dissolve the mixture of chitosan with iodomethane in mole ratio of 1:10 into the aqueous solution of methanol in volume ratio of 11:8 for agitating and mixing diffusion; next dissolve the newly-formed mixture by adding sodium chloride (NaCl); then separate the collected precipitation by acetone; finally finish the property modification via drying under decompression. The resulting property modification rate is approximately 31.2% as shown in the Table (B) as below.

TABLE (B)

|  | Elemental Analysis | | | |
| --- | --- | --- | --- | --- |
| Formula | C % | H % | N % | O % |
| $(C_6H_{11}NO_4)_n(161)_n$ | 39.72 | 6.31 | 6.94 | 40.01 |
| $(C_9H_{18}NO_4^+Cl^-)_n(239.5)_n$* | 44.87 | 7.11 | 7.55 | 34.5 |

Wherein, for modifying the properties of the chitosans of middle and low molecular weights by sol-gel method after control of the molecular weight in step (c) of reducing chitosan to nanometer scale, the actual processing procedure is depicted as that firstly for aqueous solution with water of 1980 grams and chitosan of 20 grams in the stainless steel vat, put 18% lactic acid of 333 grams therein to dissolve the interim chitosan into chitosan solution so that the weight concentration of the lactic acid in the chitosan solution is 2.5%; next filter out the impurities by screen and put aqueous chitosan solution with sodium hydroxide of 1.5% weight concentration twice respectively into the residual pure chitosan solution in the other stainless steel vat; The first aqueous solution of sodium hydroxide is to change the pH value of the chitosan solution up to near 7 so that a preliminary colloid chitosan is yielded via hydrolysis and condensation by the agitating mix; The second aqueous solution of sodium hydroxide is to change the pH value range of the chitosan solution between 7 and 8 so that the final colloid chitosan is yielded by the agitating mix; then separate the final colloid chitosan from solution by centrifugal method to obtain the resulting colloidal gel structural chitosan of nanometer scale with average particle diameter of 82 nm.

Moreover, for modifying the properties of the chitosans of middle and low molecular weights by sol-gel method after control of the molecular weight and the quaternary ammonium salt/synthesis in step (c) of reducing chitosan to nanometer scale, the actual processing procedure is depicted as that firstly for 3890 grams of water in the stainless steel vat, put 20 grams chitosan, which being treated by quaternary ammonium salt/synthesis, to form aqueous chitosan solution; next filter out the impurities by screen and put aqueous chitosan solution with sodium hydroxide of 1.0% weight concentration twice respectively into the residual pure chitosan solution in the other stainless steel vat; The first aqueous solution of sodium hydroxide is to change the pH value range of the chitosan solution between 8.5 and 9 so that a preliminary colloid chitosan is yielded via hydrolysis and condensation by the agitating mix; The second aqueous solution of sodium hydroxide is to change the pH value range of the chitosan solution between 9 and 9.5 so that the final colloid chitosan is yielded by the agitating mix; then separate the final colloid chitosan from solution by centrifugal method to obtain the resulting colloidal gel structural chitosan of nanometer scale with average particle diameter of 65.5 nm.

Furthermore, for modifying the properties of the chitosans of high molecular weights by sol-gel method after the quaternary ammonium salt/synthesis in step (c) of reducing chitosan to nanometer scale, the actual processing procedure is depicted as that firstly for 3890 grams of water in the stainless steel vat, put 20 grams chitosan, which being treated by quaternary ammonium salt/synthesis, to form aqueous chitosan solution; next filter out the impurities by screen and put aqueous chitosan solution with sodium hydroxide of 1.0% weight concentration twice respectively into the residual pure chitosan solution in the other stainless steel vat; The first aqueous solution of sodium hydroxide is to change the pH value range of the chitosan solution between 9 and 9.5 so that a preliminary colloid chitosan is yielded via hydrolysis and condensation by the agitating mix; The second aqueous solution of sodium hydroxide is to change the pH value range of the chitosan solution between 9.5 and 10 so that the final colloid chitosan is yielded by the agitating mix; then separate the final colloid chitosan from solution by centrifugal method to obtain the resulting colloidal gel structural chitosan of nanometer scale with average particle diameter of 75.5 nm.

Besides, in the foregoing step (d), the actual processing procedure by mingling the dopant of (1,3-phenylene-bis 2-oxazoline, BOX) stabilizer is depicted as below: put (1,3-phenylene-bis 2-oxazoline, BOX) of 500~2500 PPM into the NMMO solvent, then mingle with wood pulp cellulose and chitosan to yield quasi-dope as shown in the Table (C) as below.

TABLE (C)

| Ratio of added (1,3-phenylene-bis 2-oxazoline, BOX) (ppm) | Permeation Rate Index (470 nm) | Degeneracy Rate of DP (%) |
|---|---|---|
| 500 | 20.1 | 26.2 |
| 1000 | 15.2 | 20.5 |
| 1500 | 13.8 | 14.7 |
| 2000 | 10.2 | 11.6 |
| 2500 | 9.8 | 11.3 |

DP = degree of polymerization

Comparing to the conventional stabilizers of sodium hexametaphosphate (SHMP) and n-proply gallate (P.G.), the dopant of (1,3-phenylene-bis 2-oxazoline, BOX) stabilizer used in the present invention is stained by less color relatively with index transparent rate of spectrophotometer decreasing from 51.1 down to 10.2 in color index of 470 nm so that not only the rate of solvent recovery can be increased due to the simplification of the refining procedure in the solvent recovery as shown in the Table (D) below, but also the solvent cost is benefited due to cheaper price in additive than that of the conventional additives as shown in the Table (E) below.

TABLE (D)

| Kind of Additive | DP | Cellulose Concentration | Ratio of Additive (ppm) | Permeation Rate Index (470 nm) | Degeneracy Rate of DP (%) |
|---|---|---|---|---|---|
| SHMP | 950 | 13.3% | 2000 | 46.8 | 26.1 |
| P.G. | 950 | 13.3% | 2000 | 51.1 | 26.7 |
| 1,3 P-BOX | 950 | 13.3% | 2000 | 10.2 | 11.6 |

SHMP = Sodium hexametaphosphate
P.G. = n-proply gallate
1,3 P-BOX = 1,3-phenylene-bis-2 oxazoline
DP = degree of polymerization

TABLE (E)

| Kind of Additive | Unit Price (NT$/kg) | Ratio of Additive (ppm) | Conventional | | Present Invention | |
|---|---|---|---|---|---|---|
| | | | Solvent Cost | Total | Solvent Cost | Total |
| SHMP | 1000.00 | 2000 | 270.00 | 270.27 | 195.00 | 195.27 |
| P.G. | 28000.00 | 2000 | 270.00 | 277.50 | 195.00 | 202.50 |
| 1,3 P-BOX | 960.00 | 2000 | — | — | 195.00 | 195.26 |

All monetary values are in NT$ and unit price is in NT$/kg
SHMP = Sodium hexametaphosphate
P.G. = n-proply gallate
1,3 P-BOX = 1,3-phenylene-bis-2 oxazoline Furthermore, the primary NMMO solvent used in the process of the present invention will be liberated during water rinse of the fiber regeneration. As considerable quantity of the NMMO solvent has been used, the recovery rate will significantly affect the integral process cost. The actual procedure of the NMMO solvent recovery includes steps as below:
(1). Bleach:
De-color the NMMO solvent by absorption of the suspended active carbon, namely, put 0.05%~0.10% active carbon powder of good absorptivity and suspension ability into the liquid of NMMO solvent to be de-colored, then alternate the air-blast mixing with absorption and the stationary suspending absorption treatments with treating time ratio between 1:3 to 1:6 for 8 hours to finish the bleaching procedure so that not only the related equipments can be simplified with simplified but also the energy can be saved as well as the bleaching effect can be promoted.

(2). Filtration: Adopting Two Filtering Stages.

First coarse filtering stage: for simplifying the equipment, general cartridge filter is used together with the auxiliary filtering agent, which is pre-coated over the surface of the cartridge filter, and put 0.03%~0.05% of leavening agents into the liquid to be filtrated for not only preventing the active carbon from accumulating on the surface thereof in hindering the filtering speed but also regularly maintaining filtering effect of high performance without decay. The composition of said auxiliary filtering agent is preferably made of diatomite and cellulose in ratio of 4:1. After completion of the coarse filtering stage, the filtering dregs and residual liquid can be centrifugal and dehydrating treated for recovery so that the residual auxiliary filtering agent dehydrated can be reused as auxiliary filtering effect being remained.

Second fine filtering stage: by means of fine filter UF, the purity of the filtered liquid will be the same as fresh NMMO solvent. The features of this two filtering stages in coarse filtering stage and fine filtering stage are low equipment cost, low consumption rate, high treating quantity and high purity.

(3). Condensation:

To recover the rinsing liquid in the present invention, the condensing load in dehydration is very large in manner of approximately 90 tons per ton of fiber as solvent concentration must be condensed from 6.5%~8.0% to 50%~55%. For low yield quantity of fiber, the tri-effect condensing method is adopted to dehydrate per ton of rinsing liquid in using 0.5 ton of steam (high steam consumption, low electric power consumption); For high yield quantity of fiber, the MVR condensing method is adopted to dehydrate per ton of rinsing liquid in using 0.003~0.03 ton of steam (low steam consumption, high electric power consumption); The yield condensed solvent and water in both foregoing condensing methods can also be completely recovered for reusing though each condensing method is only suitable for different specific yield quantity of fiber. Wherein, the yield condensed solvent can be reused as processing solvent and yield condensed water can be reused to rinse fiber.

(4). Refinement:

adopting 80° C. low temperature oxidation and neutralizing reduction: Using 35% $H_2O_2$ as oxidant and 85% $N_2H_4.H_2O$ as neutralizing reductant, the result is measured by electric potential titrating method; the NMM content can be decreased down below 10 ppm so that not only the purity of NMMO can be promoted but also the NMMO consumption can be decreased.

For expedite you to further understand the efficacy of the present invention, the experimental embodiments with different compositions, conditions and parameters in accordance with process thereof are described in detail as below.

All the nomenclature and glossary used hereinafter are called for short as following:
DA=(Degree of de-acetylation)
DP=(Degree of polymerization)
Mw=(Molecular Weight)
NMMO=(N-methylmorpholine N-oxide)
P.G.=(n-proply gallate)
SHMP=(Sodium hexametaphosphate)
1,3 P-BOX=(1,3-phenylene-bis-2 oxazoline)

Embodiment 1: (Samples in Number 1~12 for the Present Invention)

Material Preparation:
Take wood pulp cellulose (DP=650) and chitosans (DA=87% and 95%) of high polymer as raw materials in this experimental embodiment, where DA means degree of de-acetylation and DP means degree of polymerization.
Solvent:
Take NMMO as solvent, where NMMO means N-methylmorpholine N-oxide.
Modification:
Through property modifying and nanometer scale reducing to primary chitosan, the modified chitosan of water solubility in nanometer scale is obtained to serve as additive for fiber of natural cellulose.
Blending to Form Quasi-Dope:
Blend the modified chitosans into the syrup-like mixture of wood pulp and NMMO solvent and dopant of (1,3-phenylene-bis 2-oxazoline, BOX) stabilizer to form quasi-dope such that chitosan content is 0.1 wt %~5.0 wt %.
Dehydration:
Dehydrate the foregoing quasi-dope of syrup-like mixture by vacuum film evaporator and thermal treatment at 80° C.~120° C. for 5 minutes in dehydrating extra water to 5%~13% therein.
Dope Formation:
Dissolve the foregoing dehydrated quasi-dope into mud-like dope of suitable viscosity. The constituents of the dope are shown as in the FIG. 1.
Filament Spinning:
By means of dry-jet wet spinning method, force the dope to spinning machine by quantitative pump for extruding the dope from the spinneret into filament.
Regeneration:
Put the spun filament into the coagulation bath via an air gap for coagulating and regenerating.
Refining:
Rinse, dry and apply lubricant on the regenerated filament from the coagulation bath to produce the natural cellulose fiber with feature of enhanced antifungal, antibacteria and deodorant capability.
Final Product:
Either via drawing and winding process or via drawing, crimping/setting and cutting process, the resultant product can be either wound into continuous filament yarn or cut into staple fiber in accordance with the required length.

The samples in number 1~12 for resultant fiber with feature of enhanced antifungal, antibacteria and deodorant capability aforesaid are shown in the Table (1) as below.

Embodiment 2: (Samples in Number 13~24 for the Present Invention)

Material Preparation:
Take wood pulp cellulose (DP=1050) and chitosans (DA=87% and 95%) of high polymer as raw materials in this experimental embodiment, where DA means degree of de-acetylation and DP means degree of polymerization.
Solvent:
Take NMMO as solvent, where NMMO means N-methylmorpholine N-oxide.
Modification:
Through property modifying and nanometer scale reducing to primary chitosan, the modified chitosan of water solubility in nanometer scale is obtained to serve as additive for fiber of natural cellulose.

Blending to Form Quasi-Dope:

Blend the modified chitosans into the syrup-like mixture of wood pulp and NMMO solvent and dopant of (1,3-phenylene-bis 2-oxazoline, BOX) stabilizer to form quasi-dope such that chitosan content is 0.1 wt %~5.0 wt %.

Dehydration:

Dehydrate the foregoing quasi-dope of syrup-like mixture by vacuum film evaporator and thermal treatment at 80° C.~120° C. for 5 minutes in dehydrating extra water to 5%~13% therein.

Dope Formation:

Dissolve the foregoing dehydrated quasi-dope into mud-like dope of suitable viscosity. The constituents of the dope are shown as in the FIG. 1.

Filament Spinning:

By means of dry-jet wet spinning method, force the dope to spinning machine by quantitative pump for extruding the dope from the spinneret into filament.

Regeneration:

Put the spun filament into the coagulation bath via an air gap for coagulating and regenerating.

Refining:

Rinse, dry and apply lubricant on the regenerated filament from the coagulation bath to produce the natural cellulose fiber with feature of enhanced antifungal, antibacteria and deodorant capability.

Final Product:

Either via drawing and winding process or via drawing, crimping/setting and cutting process, the resultant product can be either wound into continuous filament yarn or cut into staple fiber in accordance with the required, length.

The samples in number 13~24 for resultant fiber with feature of enhanced antifungal, antibacteria and deodorant capability aforesaid are shown in the Table (1) as below.

TABLE (1)

Dope Constituent Table for Different Samples

| Sample Number | DP | Ratio of Chitosan (wt %) | Chitosan Deacetylation (%) | Cellulose Content (%) | Solvent Content (%) | Water Content (%) |
|---|---|---|---|---|---|---|
| Number of Fiber Sample 1~12 in Embodiment 1 ||||||||
| 1 | 650 | 0.1 | 87 | 11.6 | 77.3 | 11.1 |
| 2 | 650 | 0.5 | 87 | 11.5 | 77.9 | 10.6 |
| 3 | 650 | 1.0 | 87 | 12.1 | 77.2 | 10.7 |
| 4 | 650 | 3.0 | 87 | 11.5 | 78.0 | 10.5 |
| 5 | 650 | 5.0 | 87 | 11.2 | 77.8 | 11.0 |
| 6 | 650 | 7.0 | 87 | 11.9 | 76.9 | 11.2 |
| 7 | 650 | 0.1 | 95 | 11.5 | 77.6 | 10.9 |
| 8 | 650 | 0.5 | 95 | 12.1 | 77.8 | 10.1 |
| 9 | 650 | 1.0 | 95 | 11.5 | 77.7 | 10.8 |
| 10 | 650 | 3.0 | 95 | 11.2 | 78.3 | 10.5 |
| 11 | 650 | 5.0 | 95 | 11.8 | 78.0 | 10.2 |
| 12 | 650 | 7.0 | 95 | 12.1 | 77.8 | 10.1 |
| Number of Fiber Sample 13~24 in Embodiment 2 ||||||||
| 13 | 1050 | 0.1 | 87 | 11.8 | 77.8 | 10.4 |
| 14 | 1050 | 0.5 | 87 | 11.5 | 77.1 | 11.4 |
| 15 | 1050 | 1.0 | 87 | 11.1 | 78.1 | 10.8 |
| 16 | 1050 | 3.0 | 87 | 11.2 | 78.0 | 10.8 |
| 17 | 1050 | 5.0 | 87 | 11.9 | 77.0 | 11.1 |
| 18 | 1050 | 7.0 | 87 | 11.2 | 78.2 | 10.6 |
| 19 | 1050 | 0.1 | 95 | 11.9 | 76.2 | 11.9 |
| 20 | 1050 | 0.5 | 95 | 12.0 | 77.5 | 10.5 |
| 21 | 1050 | 1.0 | 95 | 11.1 | 78.1 | 10.8 |
| 22 | 1050 | 3.0 | 95 | 11.9 | 76.2 | 11.9 |
| 23 | 1050 | 5.0 | 95 | 11.5 | 78.0 | 10.5 |
| 24 | 1050 | 7.0 | 95 | 11.2 | 78.1 | 10.7 |

DP = degree of polymerization

Embodiment 3: (The Evaluation of the Antifungal Capability)

Testing Fungus:

Adopt Staphylococcus aureus subsp. Aureus10451 as experiment fungus.

Reagent:

Take 0.2 ml of testing fungus solution, which incubate said fungus up to $5~70E^{+5}$ (number/ml), to mix with sterilized buffer saline for violently shaking 30 times so that the testing fungi spread over the solution, which is properly diluted into reagent.

Experiment:

Take 1 ml of foregoing reagent for agar broth incubation under conditions of 35° C. temperature for 48 hours.

Calculation:

Count the growth number of the incubated fungi aforesaid to figure out the actual fungus number on the sample by calculation of the dilution multitude and volume.

Evaluation:

Repeat above experiment for 6 times and average the total fungus number for each experiment. The resulting Increment or decrement, which is calculated by following formula, can be used for evaluating the antifungal effect:

$$\text{Increment or decrement} = \log\left(\frac{B}{A}\right) - \log\left(\frac{C}{A}\right)$$

Where, A is fungus number of sample without adding chitosan, the sample is immediately incubated in the saline upon the reagent applying thereon.

B is fungus number of sample without adding chitosan, the sample is incubated in the saline after 18 hours later the reagent applying thereon.

C is fungus number of sample with chitosan adding, the sample is incubated in the saline after 18 hours later the reagent applying thereon.

Evaluating Criterion:

According to the experiment results, the sample has antifungal effect if the increment exceeds 1.6. The evaluation results for each sample are shown in the Table (2) as below.

TABLE (2)

Antifungal Capability Experiment for Cellulose Fiber with Chitosan

| Sample Number | DP | Ratio of Chitosan (wt %) | Chitosan Deacetylation (%) | Increment/ Decrement | Evaluation Result (Yes/No) |
|---|---|---|---|---|---|
| Number of Fiber Sample 1~12 in Embodiment 1 ||||||
| 1 | 650 | 0.1 | 87 | 1.21 | No |
| 2 | 650 | 0.5 | 87 | 1.72 | Yes |
| 3 | 650 | 1.0 | 87 | 2.18 | Yes |
| 4 | 650 | 3.0 | 87 | 2.43 | Yes |
| 5 | 650 | 5.0 | 87 | 2.65 | Yes |
| 6 | 650 | 7.0 | 87 | 2.76 | Yes |
| 7 | 650 | 0.1 | 95 | 1.42 | No |
| 8 | 650 | 0.5 | 95 | 1.77 | Yes |
| 9 | 650 | 1.0 | 95 | 2.23 | Yes |
| 10 | 650 | 3.0 | 95 | 2.44 | Yes |
| 11 | 650 | 5.0 | 95 | 2.70 | Yes |
| 12 | 650 | 7.0 | 95 | 2.87 | Yes |
| Number of Fiber Sample 13~24 in Embodiment 2 ||||||
| 13 | 1050 | 0.1 | 87 | 1.21 | No |
| 14 | 1050 | 0.5 | 87 | 1.70 | Yes |
| 15 | 1050 | 1.0 | 87 | 2.20 | Yes |
| 16 | 1050 | 3.0 | 87 | 2.41 | Yes |

TABLE (2)-continued

Antifungal Capability Experiment for Cellulose Fiber with Chitosan

| Sample Number | DP | Ratio of Chitosan (wt %) | Chitosan Deacetylation (%) | Increment/ Decrement | Evaluation Result (Yes/No) |
|---|---|---|---|---|---|
| 17 | 1050 | 5.0 | 87 | 2.58 | Yes |
| 18 | 1050 | 7.0 | 87 | 2.73 | Yes |
| 19 | 1050 | 0.1 | 95 | 1.23 | No |
| 20 | 1050 | 0.5 | 95 | 1.79 | Yes |
| 21 | 1050 | 1.0 | 95 | 2.25 | Yes |
| 22 | 1050 | 3.0 | 95 | 2.44 | Yes |
| 23 | 1050 | 5.0 | 95 | 2.61 | Yes |
| 24 | 1050 | 7.0 | 95 | 2.79 | Yes |

DP = degree of polymerization

Embodiment 4: (The Evaluation of the Antibacteria Capability)

Fundamental:
The experiment is in accordance with JIS L1902-1998 Quantitative Method.

Principle:
The ordinary chitosan is the derivative of the chitin through deacetylation. The chitosan is a natural non-toxic high polymer with bacteriostatic and biodegradable feature to defend against the fungi and microbes because it is positively charged to readily bind with negatively charged surfaces such as protein. The suppressing ability to the bacteria and fungi of the chitosan comes from its molecular weight and functional radical, which will bond with aluminate acid or silicic acid on the phospholipid substance, so that the activity of the microbe is curbed. The oligmer of chitosan can penetrate the biological cell membrane to repress the duplicating of the RNA.

Testing Bacteria:
Adopt type (A) bacteria: Methicillin Resistant *Staphyloccous Aureus* (MRSA) (ATCC 6538P) and type (B) bacteria: *Klebsiella Pheumoniae* (ATCC 4352) as two experiment bacteria.

Testing Object:
Take modified chitosan of the present invention as antibacteria sample to test whether it has antibacteria capability.

Experiment:
The incubated bacteria concentration within $1.0\pm0.3\ E^{+5}$ (number/ml) means valid for the experiment. And, the numerical ($1.3\ E^{+4}$) denotes 13,000 with analog below. Ma is bacteria number of un-processed sample in immediate count upon cleansing without incubation; Mb is bacteria number of un-processed sample after being incubated for 18~24 hours; Mc is bacteria number of processed sample after being incubated for 18~24 hours.

Calculating Formula:
The growing activity value of the bacteria (BGA) is calculated by following formula such that BGA>1.5 means valid of the experiment.

Growing Activity value of the Bacteria: $BGA = \log(Mb) - \log(Ma)$

Bacteriostatic value of the sample: $BSN = \log(Mb) - \log(Mc)$

Bactericidal value of the sample: $BKN = \log(Ma) - \log(Mc)$

Evaluating Criterion:
According to criterion from the "Japan Association of Fiber Evaluating Technology for new function" (JAFET), the antibacteria function is that:

The testing sample has bacteriostatic effect if its bacteriostatic value BSN>2.2.

The testing sample has bactericidal effect if its bactericidal value BKN>0.

Table (3) is experimental results for testing antibacteria capability of sample cellulose fiber containing the modified chitosan of the present invention with Type (A) bacteria of Methicillin Resistant *Staphyloccous Aureus* (MRSA) (ATCC 6538P) as testing bacteria.

Table (4) is experimental results for testing antibacteria capability of sample cellulose fiber containing the modified chitosan of the present invention with Type (B) bacteria of *Klebsiella Pheumoniae* (ATCC 4352) as testing bacteria.

Evaluating Inference:
From Tables (3) and (4), the sample cellulose fiber containing the modified chitosan of the present invention has excellent antibacteria capability both in bacteriostatic and bactericidal effects for both of bacteria of Methicillin Resistant *Staphyloccous Aureus* (MRSA) (ATCC 6538P) and *Klebsiella Pheumoniae* (ATCC 4352). The experimental result for testing antibacteria capability for each sample is shown in the Tables (3) and (4) as below.

TABLE (3)

Antibacteria Capability Experiment for Cellulose Fiber with Chitosan
Experiment Bacteria
Type (A): Methicillin Resistant *Staphyloccous Aureus* (MRSA) (ATCC 6538P)

| Sample Number | DP | Ratio of Chitosan (wt %) | Chitosan Deacetylation (%) | QV of BS | QV of BC | Evaluation Result (Yes/No) |
|---|---|---|---|---|---|---|
| Number of Fiber Sample 1~12 in Embodiment 1 | | | | | | |
| 1 | 650 | 0.1 | 87 | >1.7 | >1.3 | No |
| 2 | 650 | 0.5 | 87 | >4.9 | >3.1 | Yes |
| 3 | 650 | 1.0 | 87 | >4.9 | >3.1 | Yes |
| 4 | 650 | 3.0 | 87 | >4.9 | >3.1 | Yes |
| 5 | 650 | 5.0 | 87 | >4.9 | >3.1 | Yes |
| 6 | 650 | 7.0 | 87 | >4.9 | >3.1 | Yes |
| 7 | 650 | 0.1 | 95 | >1.8 | >1.1 | No |
| 8 | 650 | 0.5 | 95 | >4.9 | >3.1 | Yes |
| 9 | 650 | 1.0 | 95 | >4.9 | >3.1 | Yes |
| 10 | 650 | 3.0 | 95 | >4.9 | >3.1 | Yes |
| 11 | 650 | 5.0 | 95 | >4.9 | >3.1 | Yes |
| 12 | 650 | 7.0 | 95 | >4.9 | >3.1 | Yes |
| Number of Fiber Sample 13~24 in Embodiment 2 | | | | | | |
| 13 | 1050 | 0.1 | 87 | >1.7 | >1.2 | No |
| 14 | 1050 | 0.5 | 87 | >4.9 | >3.1 | Yes |
| 15 | 1050 | 1.0 | 87 | >4.9 | >3.1 | Yes |
| 16 | 1050 | 3.0 | 87 | >4.9 | >3.1 | Yes |
| 17 | 1050 | 5.0 | 87 | >4.9 | >3.1 | Yes |
| 18 | 1050 | 7.0 | 87 | >4.9 | >3.1 | Yes |
| 19 | 1050 | 0.1 | 95 | >1.8 | >1.0 | No |
| 20 | 1050 | 0.5 | 95 | >4.9 | >3.1 | Yes |
| 21 | 1050 | 1.0 | 95 | >4.9 | >3.1 | Yes |
| 22 | 1050 | 3.0 | 95 | >4.9 | >3.1 | Yes |
| 23 | 1050 | 5.0 | 95 | >4.9 | >3.1 | Yes |
| 24 | 1050 | 7.0 | 95 | >4.9 | >3.1 | Yes |

The experiment is in accordance with (JIS L1902-1998 Quantitative Method)
DP = degree of polymerization
QV of BS = Quantitative value of bacteriostatic ability
QV of BC = Quantitative value of bactericidal ability

TABLE (4)

Antibacteria Capability Experiment for Cellulose Fiber with Chitosan
Experiment Bacteria Type (B): Type (B):
*Klebsiella Pheumoniae* (ATCC 4352)

| Sample Number | DP | Ratio of Chitosan (wt %) | Chitosan Deacetylation (%) | QV of BS | QV of BC | Evaluation Result (Yes/No) |
|---|---|---|---|---|---|---|
| Number of Fiber Sample 1~12 in Embodiment 1 | | | | | | |
| 1 | 650 | 0.1 | 87 | >2.0 | >1.0 | No |
| 2 | 650 | 0.5 | 87 | >6.2 | >3.1 | Yes |
| 3 | 650 | 1.0 | 87 | >6.2 | >3.1 | Yes |
| 4 | 650 | 3.0 | 87 | >6.2 | >3.1 | Yes |
| 5 | 650 | 5.0 | 87 | >6.2 | >3.1 | Yes |
| 6 | 650 | 7.0 | 87 | >6.2 | >3.1 | Yes |
| 7 | 650 | 0.1 | 95 | >2.0 | >1.0 | No |
| 8 | 650 | 0.5 | 95 | >6.2 | >3.1 | Yes |
| 9 | 650 | 1.0 | 95 | >6.2 | >3.1 | Yes |
| 10 | 650 | 3.0 | 95 | >6.2 | >3.1 | Yes |
| 11 | 650 | 5.0 | 95 | >6.2 | >3.1 | Yes |
| 12 | 650 | 7.0 | 95 | >6.2 | >3.1 | Yes |
| Number of Fiber Sample 13~24 in Embodiment 2 | | | | | | |
| 13 | 1050 | 0.1 | 87 | >2.0 | >1.0 | No |
| 14 | 1050 | 0.5 | 87 | >6.2 | >3.1 | Yes |
| 15 | 1050 | 1.0 | 87 | >6.2 | >3.1 | Yes |
| 16 | 1050 | 3.0 | 87 | >6.2 | >3.1 | Yes |
| 17 | 1050 | 5.0 | 87 | >6.2 | >3.1 | Yes |
| 18 | 1050 | 7.0 | 87 | >6.2 | >3.1 | Yes |
| 19 | 1050 | 0.1 | 95 | >2.0 | >1.1 | No |
| 20 | 1050 | 0.5 | 95 | >6.2 | >3.1 | Yes |
| 21 | 1050 | 1.0 | 95 | >6.2 | >3.1 | Yes |
| 22 | 1050 | 3.0 | 95 | >6.2 | >3.1 | Yes |
| 23 | 1050 | 5.0 | 95 | >6.2 | >3.1 | Yes |
| 24 | 1050 | 7.0 | 95 | >6.2 | >3.1 | Yes |

The experiment is in accordance with (JIS L1902-1998 Quantitative Method)
DP = degree of polymerization
QV of BS = Quantitative value of bacteriostatic ability
QV of BC = Quantitative value of bactericidal ability

Embodiment 5: (The Evaluation of the Deodorant Capability)

Fundamental:

The experiment for evaluating deodorant effect is on the testing basis in absorption of the ammonia odor.

Testing Method:

Step 1: fill the ammonia gas of specific concentration into the air-tight bottle;

Step 2: put the sample cellulose fiber containing the modified chitosan of the present invention of specific quantity into the same bottle aforesaid for 15 minutes;

Step 3: measure the gas concentration in the sample fiber before and after putting into the bottle by gas chromatograph.

Calculating Formula:

The ratio of the deodorant property (DOP) for ammonia absorption rate is calculated by following formula.

(DOP) for Ammonia Absorption Rate: $DOP = (Ca - Cr)/Ca$

Where, Ca is the gas concentration in the sample fiber before absorbing ammonia.

Cr is the gas concentration in the sample fiber after absorbing ammonia.

Evaluating Inference:

As shown in the Tables (5) below, when weight percentage in content of the modified chitosan of the present invention contained in the sample cellulose fiber is over 0.5 wt %, the ratio of the deodorant property (DOP) for ammonia absorption rate of the sample fiber is always over 50%, which means it has excellent deodorant capability.

The experimental result for testing antibacteria capability for each sample is shown in the Tables (5) as below.

TABLE (5)

Deodorant Capability Experiment for Cellulose Fiber with Chitosan

| Sample Number | DP | Ratio of Chitosan (wt %) | Chitosan Deacetylation (%) | Ammonia Absorption Rate (%) | Evaluation Result (Yes/No) |
|---|---|---|---|---|---|
| Number of Fiber Sample 1~12 in Embodiment 1 | | | | | |
| 1 | 650 | 0.1 | 87 | 18.5 | No |
| 2 | 650 | 0.5 | 87 | 65.4 | Yes |
| 3 | 650 | 1.0 | 87 | 69.3 | Yes |
| 4 | 650 | 3.0 | 87 | 79.5 | Yes |
| 5 | 650 | 5.0 | 87 | 84.8 | Yes |
| 6 | 650 | 7.0 | 87 | 85.9 | Yes |
| 7 | 650 | 0.1 | 95 | 22.8 | No |
| 8 | 650 | 0.5 | 95 | 66.2 | Yes |
| 9 | 650 | 1.0 | 95 | 70.7 | Yes |
| 10 | 650 | 3.0 | 95 | 82.1 | Yes |
| 11 | 650 | 5.0 | 95 | 85.9 | Yes |
| 12 | 650 | 7.0 | 95 | 87.3 | Yes |
| Number of Fiber Sample 13~24 in Embodiment 2 | | | | | |
| 13 | 1050 | 0.1 | 87 | 19.7 | No |
| 14 | 1050 | 0.5 | 87 | 65.6 | Yes |
| 15 | 1050 | 1.0 | 87 | 69.3 | Yes |
| 16 | 1050 | 3.0 | 87 | 80.0 | Yes |
| 17 | 1050 | 5.0 | 87 | 83.1 | Yes |
| 18 | 1050 | 7.0 | 87 | 85.2 | Yes |
| 19 | 1050 | 0.1 | 95 | 22.8 | No |
| 20 | 1050 | 0.5 | 95 | 64.8 | Yes |
| 21 | 1050 | 1.0 | 95 | 71.5 | Yes |
| 22 | 1050 | 3.0 | 95 | 82.1 | Yes |
| 23 | 1050 | 5.0 | 95 | 85.9 | Yes |
| 24 | 1050 | 7.0 | 95 | 87.3 | Yes |

DP = degree of polymerization

The evaluation of the antifungal, antibacteria and deodorant capability:

The upper limit instance for each water laundering in general household is to launder under condition in 70° C. hot water with 5 g/L laundry detergent for 45 minutes. The experimental result for testing the antifungal, antibacteria and deodorant capability for each sample by foregoing laundering method for 10 times is shown in the Tables (6), (7) and (8) as below.

Embodiment 6: (The Evaluation of the Antifungal Capability)

TABLE (6)

Antifungal Capability Experiment for Cellulose Fiber with Chitosan
After 10 times of washing in 70° C. hot water
with 5 g/L detergent for 45 minutes

| Sample Number | DP | Ratio of Chitosan (wt %) | Chitosan Deacetylation (%) | Increment/ Decrement | Evaluation Result (Yes/No) |
|---|---|---|---|---|---|
| Number of Fiber Sample 1~12 in Embodiment 1 | | | | | |
| 1 | 650 | 0.1 | 87 | 1.16 | No |
| 2 | 650 | 0.5 | 87 | 1.58 | Yes |
| 3 | 650 | 1.0 | 87 | 1.99 | Yes |
| 4 | 650 | 3.0 | 87 | 2.21 | Yes |
| 5 | 650 | 5.0 | 87 | 2.55 | Yes |
| 6 | 650 | 7.0 | 87 | 2.39 | Yes |
| 7 | 650 | 0.1 | 95 | 1.35 | No |

TABLE (6)-continued

Antifungal Capability Experiment for Cellulose Fiber with Chitosan
After 10 times of washing in 70° C. hot water
with 5 g/L detergent for 45 minutes

| Sample Number | DP | Ratio of Chitosan (wt %) | Chitosan Deacetylation (%) | Increment/ Decrement | Evaluation Result (Yes/No) |
|---|---|---|---|---|---|
| 8 | 650 | 0.5 | 95 | 1.61 | Yes |
| 9 | 650 | 1.0 | 95 | 2.04 | Yes |
| 10 | 650 | 3.0 | 95 | 2.22 | Yes |
| 11 | 650 | 5.0 | 95 | 2.48 | Yes |
| 12 | 650 | 7.0 | 95 | 2.62 | Yes |
| Number of Fiber Sample 13~24 in Embodiment 2 | | | | | |
| 13 | 1050 | 0.1 | 87 | 1.16 | No |
| 14 | 1050 | 0.5 | 87 | 1.56 | Yes |
| 15 | 1050 | 1.0 | 87 | 1.97 | Yes |
| 16 | 1050 | 3.0 | 87 | 2.01 | Yes |
| 17 | 1050 | 5.0 | 87 | 2.32 | Yes |
| 18 | 1050 | 7.0 | 87 | 2.48 | Yes |
| 19 | 1050 | 0.1 | 95 | 1.17 | No |
| 20 | 1050 | 0.5 | 95 | 1.62 | Yes |
| 21 | 1050 | 1.0 | 95 | 2.06 | Yes |
| 22 | 1050 | 3.0 | 95 | 2.24 | Yes |
| 23 | 1050 | 5.0 | 95 | 2.38 | Yes |
| 24 | 1050 | 7.0 | 95 | 2.46 | Yes |

DP = degree of polymerization

Embodiment 7: (The Evaluation of the Antibacteria Capability)

TABLE (7)

Antibacteria Capability Experiment for Cellulose Fiber with Chitosan
After 10 times of washing in 70° C. hot
water with 5 g/L detergent for 45 minutes
Experiment Bacteria Type: *Klebsiella Pheumoniae* (ATCC 4352)

| Sample Number | DP | Ratio of Chitosan (wt %) | Chitosan Deacetylation (%) | QV of BS | QV of BC | Evaluation Result (Yes/No) |
|---|---|---|---|---|---|---|
| Number of Fiber Sample 1~12 in Embodiment 1 | | | | | | |
| 1 | 650 | 0.1 | 87 | >2.0 | >0.3 | No |
| 2 | 650 | 0.5 | 87 | >3.2 | >1.5 | Yes |
| 3 | 650 | 1.0 | 87 | >3.6 | >2.3 | Yes |
| 4 | 650 | 3.0 | 87 | >4.2 | >2.2 | Yes |
| 5 | 650 | 5.0 | 87 | >4.2 | >2.3 | Yes |
| 6 | 650 | 7.0 | 87 | >4.2 | >2.3 | Yes |
| 7 | 650 | 0.1 | 95 | >2.0 | >0.3 | No |
| 8 | 650 | 0.5 | 95 | >3.2 | >1.5 | Yes |
| 9 | 650 | 1.0 | 95 | >3.6 | >2.3 | Yes |
| 10 | 650 | 3.0 | 95 | >4.2 | >2.2 | Yes |
| 11 | 650 | 5.0 | 95 | >4.2 | >2.3 | Yes |
| 12 | 650 | 7.0 | 95 | >4.2 | >2.3 | Yes |
| Number of Fiber Sample 13~24 in Embodiment 2 | | | | | | |
| 13 | 1050 | 0.1 | 87 | >2.0 | >0.3 | No |
| 14 | 1050 | 0.5 | 87 | >3.2 | >1.5 | Yes |
| 15 | 1050 | 1.0 | 87 | >3.6 | >2.3 | Yes |
| 16 | 1050 | 3.0 | 87 | >4.2 | >2.2 | Yes |
| 17 | 1050 | 5.0 | 87 | >4.2 | >2.3 | Yes |
| 18 | 1050 | 7.0 | 87 | >4.2 | >2.3 | Yes |
| 19 | 1050 | 0.1 | 95 | >2.0 | >0.3 | No |
| 20 | 1050 | 0.5 | 95 | >3.2 | >1.5 | Yes |
| 21 | 1050 | 1.0 | 95 | >3.6 | >2.3 | Yes |
| 22 | 1050 | 3.0 | 95 | >4.2 | >2.2 | Yes |
| 23 | 1050 | 5.0 | 95 | >4.2 | >2.3 | Yes |
| 24 | 1050 | 7.0 | 95 | >4.2 | >2.3 | Yes |

The experiments in accordance with (JIS L1902-1998 Quantitative Method)
DP = degree of polymerization
QV of BS = Quantitative value of bacteriostatic ability
QV of BC = Quantitative value of bactericidalability Embodiment 8: (The Evaluation of the Deodorant Capability)

TABLE (8)

Deodorant Capability Experiment for Cellulose Fiber with Chitosan
After 10 times of washing in 70° C. hot water
with 5 g/L detergent for 45 minutes

| Sample Number | DP | Ratio of Chitosan (wt %) | Chitosan Deacetylation (%) | Ammonia Absorption Rate (%) | Evaluation Result (Yes/No) |
|---|---|---|---|---|---|
| Number of Fiber Sample 1~12 in Embodiment 1 | | | | | |
| 1 | 650 | 0.1 | 87 | 17.6 | No |
| 2 | 650 | 0.5 | 87 | 55.2 | Yes |
| 3 | 650 | 1.0 | 87 | 68.6 | Yes |
| 4 | 650 | 3.0 | 87 | 64.4 | Yes |
| 5 | 650 | 5.0 | 87 | 76.4 | Yes |
| 6 | 650 | 7.0 | 87 | 71.1 | Yes |
| 7 | 650 | 0.1 | 95 | 36.2 | No |
| 8 | 650 | 0.5 | 95 | 63.5 | Yes |
| 9 | 650 | 1.0 | 95 | 57.2 | Yes |
| 10 | 650 | 3.0 | 95 | 62.3 | Yes |
| 11 | 650 | 5.0 | 95 | 69.3 | Yes |
| 12 | 650 | 7.0 | 95 | 72.4 | Yes |
| Number of Fiber Sample 13~24 in Embodiment 2 | | | | | |
| 13 | 1050 | 0.1 | 87 | 33.6 | No |
| 14 | 1050 | 0.5 | 87 | 55.1 | Yes |
| 15 | 1050 | 1.0 | 87 | 59.9 | Yes |
| 16 | 1050 | 3.0 | 87 | 65.2 | Yes |
| 17 | 1050 | 5.0 | 87 | 70.3 | Yes |
| 18 | 1050 | 7.0 | 87 | 70.2 | Yes |
| 19 | 1050 | 0.1 | 95 | 34.5 | No |
| 20 | 1050 | 0.5 | 95 | 53.5 | Yes |
| 21 | 1050 | 1.0 | 95 | 62.8 | Yes |
| 22 | 1050 | 3.0 | 95 | 67.6 | Yes |
| 23 | 1050 | 5.0 | 95 | 68.7 | Yes |
| 24 | 1050 | 7.0 | 95 | 69.2 | Yes |

DP = degree of polymerization

As the experimental results for testing antifungal and antibacteria capability shown in the Tables (2), (3) and (4), the selected sample cellulose fiber with DP of 650 containing the modified chitosan of the present invention can have excellent antifungal and antibacteria capability both in bacteriostatic and bactericidal effects. Comparing to the conventional contemporary of the Taiwan Invention Patent in number of 147162, whose DP of the selected cellulose fiber must be over 900 to have basic antifungal and antibacteria capability, the DP of 650 for the cellulose fiber in the present invention offers wider extent of selection in the DP so that not only the application range is increased but also the total processing cost in mass production is reduced.

As the experimental results for testing deodorant capability further shown in the Table (5), the weight percentage in content of the modified chitosan of the present invention contained in the sample cellulose fiber can be down to 0.1% to have excellent deodorant capability both in bacteriostatic and bactericidal effects. Contrarily observing the conventional contemporary of the Taiwan Invention Patent in number of 147162, whose weight percentage in content of the modified chitosan must be over 0.5% to have basic deodorant capability, the 0.1% of weight percentage in content of modified chitosan for the cellulose fiber in the present invention, by the same token, offers better flexibility of adding percentage in content of modified chitosan so that not only the application range is increased but also the total processing cost in mass production is reduced.

As the experimental results for testing antifungal, antibacteria and deodorant capability further shown in the Tables (6), (7) and (8), even to launder for 10 times under condition of 5 g/L in 70° C. hot water with 5 g/L laundry detergent for 45 minutes, the antifungal and antibacteria capability for the cellulose fiber containing modified chitosan in the present invention can still keep 90% approximately; Thereby, it really is a natural cellulose fiber with long-lasting persistence in antifungal, antibacteria and deodorant capability.

In conclusion, the chitosan, which has been treated by property modification and reduced to nanometer scale, can effectively and completely solve in the cellulose of low DP to offer wider extent of selection in the DP and better flexibility of adding percentage in content of modified chitosan so that not only the application range is increased but also the total processing cost in mass production is reduced less than 0.1% without sacrificing the effect in antifungal, antibacteria and deodorant capability. Thus, it really has innovative novelty beyond obviousness of the prior arts and practical industrial application, which meet the basic criterion of the patentability.

What is claimed is:

1. A method for enhancing the antifungal, antibacterial and deodorization capabilities of natural cellulose fiber, comprising:
   (a) selecting a raw material comprising shells of shrimp, crab and/or other sea crustaceans;
   (b) extracting the chitin from the raw material;
   (c) removing the internal N-acetyl groups from the chitin to produce chitosan;
   (d) deacylating the chitosan by treating the chitosan with heat and NaOH so that the chitosan is from 50 to 99% deacylated;
   (e)(i) reducing the molecular weight of the chitosan by dissolving the chitosan in a diluted acid solution under a specific temperature for different reacting times so as to obtain various chitosan of middle or low molecular weight, and/or (ii) modifying the chitosan by dissolving the chitosan in a solution of water and methanol, introducing iodomethane ($CH_3I$) and sodium chloride (NaCl) to the solution, separating the chitosan by acetone precipitation, drying the chitosan using decompressed drying, and dissolving the chitosan in an aqueous solution of de-ionized water;
   (f) nano-miniaturizing the chitosan by a sol-gel method comprising adding an adequate quantity of alkali to the chitosan, and hydrolyzing, condensing, and polymerizing the chitosan;
   (g) immersing the chitosan in a syrup-like mixture of wood pulp and N-methylmorpholine N-Oxide (NMMO) solvent with a dopant of 1,3-phenylene-bis 2-oxazoline (BOX) stabilizer;
   (h) mixing the chitosan, wood pulp cellulose, NMMO solvent and BOX stabilizer of step (g) in a horizontal blending machine at a temperature of 60-80° C. to yield quasi-dope, wherein the wood pulp cellulose is either filament fiber or staple fiber with an α-celluose content of over 85% and a degree of polymerization (DP) of between 500-1200;
   (i) dehydrating the quasi-dope by vacuum film evaporation and thermal treatment at 80-120° C. for 5 minutes to produce a dehydrated dope;
   (j) spinning the dehydrated dope by a dry-jet wet spinning method comprising forcing the dehydrated dope into a spinning machine and extruding the dehydrated dope into a coagulation bath to produce a filament;
   (k) removing the filament from the coagulation bath; and
   (l) rinsing, drying, and applying lubricant to the filament to produce a natural cellulose fiber having enhanced antifungal, antibacterial and deodorant capabilities.

2. The method of claim 1, wherein step (e)(i) comprises dissolving the chitosan in a diluted hydrochloric acid solution under a reacting temperature of 70° C. for 0.5 hour, 1 hour, 2 hours and 4 hours.

3. The method of claim 1, wherein in step (e)(ii) the molar ratio of chitosan and iodomethane ($CH_3I$) is 1:10 and wherein the volume ratio of water and methanol is 11:8.

4. The method of claim 1, wherein the method comprises steps (e)(i), and wherein step (f) comprises mixing an aqueous solution comprising 1980 grams of water and 20 grams of chitosan, adding 333 grams of 18% lactic acid to dissolve the chitosan so that the weight concentration of the lactic acid in the chitosan solution is 2.5%, filtering out the impurities, adjusting the pH to about 7 by adding sodium hydroxide, agitating, hydrolyzing and condensing the solution to yield a preliminary colloidal chitosan, adjusting the pH to between 7 and 8 by adding sodium hydroxide, agitating the solution to yield a final colloidal chitosan, and separating the final colloidal chitosan from the solution by a centrifugal method to obtain colloidal gel structural chitosan of nanometer scale with an average particle diameter of 82 nm.

5. The method of claim 1, wherein the method comprises step (e)(i) and (e)(ii), and wherein step (f) comprises mixing an aqueous solution comprising 3890 grams of water and 20 grams of chitosan, filtering out the impurities, adjusting the pH to between 8.5 and 9 by adding sodium hydroxide, agitating, hydrolyzing and condensing the solution to yeild a preliminary colloidal chitosan, adjusting the pH to between 9 and 9.5 by adding sodium hydroxide, agitating the solutions to yield a final colloidal chitosan, and separating the final colloidal chitosan from the solution by a centrifugal method to obtain a colloidal gel structural chitosan of nanometer scale with an average particle diameter of 65.5 nm.

6. The method of claim 1, wherein the method comprises step (e)(ii), and wherein step (f) comprises mixing an aqueous solution comprising 3890 grams of water and 20 grams of chitosan, filtering out the impurities, adjusting the pH to between 9 and 9.5 by adding sodium hydroxide, agitating, hydrolyzing and condensing to solution to yield a preliminary colloidal chitosan, adjusting the pH to between 9.5 and 10 by adding sodium hydroxide, agitating the solution to yield a final colloidal chitosan, and separating the final colloidal chitosan from solution by a centrifugal method to obtain colloidal gel structural chitosan of nanometer scale with an average particle diameter of 75.5 nm.

7. The method of claim 1, wherein in step (g) the concentration of NMMO is from 50-75%.

8. The method of claim 1, wherein in step (c) the molecular weight of the chitosan is from 10-520 kd.

9. The method of claim 1, wherein in step (l) the natural cellulose fiber comprises from 0.1-5.0 weight percent chitosan.

10. The method of claim 1, wherein the dry-jet wet spinning method of step (j) comprises a winding speed of from 300-800 meters per minute.

11. The method of claim 10, wherein the natural cellulose fiber of step (l) has a fiber tenacity of from 2.5-4.0 g/d.

12. The method of claim 10, wherein the filament of step (i) is extruded at a fiber elongation rate of from 4.0-8.0%.

13. The method of claim 10, wherein the natural cellulose fiber of step (l) has a Young's modulus of from 50-150 g/d.

* * * * *